(12) United States Patent
Lee (10) Patent No.: US 11,169,116 B2
(45) Date of Patent: Nov. 9, 2021

(54) PROBE FOR NONDESTRUCTIVE TESTING DEVICE USING CROSSED GRADIENT INDUCED CURRENT AND METHOD FOR MANUFACTURING INDUCTION COIL FOR NONDESTRUCTIVE TESTING DEVICE

(71) Applicant: Industry-Academic Cooperation Foundation, Chosun University, Gwangju (KR)

(72) Inventor: Jin Yi Lee, Gwangju (KR)

(73) Assignee: Industry-Academic Cooperation Foundation, Chosun University, Gwangju (KR)

( * ) Notice: Subject to any disclaimer, the term of this patent is extended or adjusted under 35 U.S.C. 154(b) by 151 days.

(21) Appl. No.: 16/694,220

(22) Filed: Nov. 25, 2019

(65) Prior Publication Data

US 2020/0166479 A1 May 28, 2020

(30) Foreign Application Priority Data

Nov. 27, 2018 (KR) .......................... 10-2018-0149026

(51) Int. Cl.
  *G01N 27/90* (2021.01)
  *H01F 41/04* (2006.01)
  *G01B 7/06* (2006.01)
  *G01N 27/02* (2006.01)

(52) U.S. Cl.
  CPC ........... *G01N 27/9046* (2013.01); *G01B 7/10* (2013.01); *G01N 27/023* (2013.01); *H01F 41/04* (2013.01)

(58) Field of Classification Search
  CPC ........ G01B 7/10; G01N 27/023; G01N 27/82; G01N 27/9046; H01F 41/04; H01F 5/00
  See application file for complete search history.

(56) References Cited

U.S. PATENT DOCUMENTS

| | | | |
|---|---|---|---|
| 2008/0007253 A1* | 1/2008 | Takahata | G01D 5/2066 324/207.22 |
| 2012/0025816 A1* | 2/2012 | Lepage | G01N 27/904 324/240 |
| 2017/0241953 A1* | 8/2017 | Kagawa | G01N 27/82 |
| 2018/0224402 A1* | 8/2018 | Rensing | G01N 27/9046 |

FOREIGN PATENT DOCUMENTS

| | | |
|---|---|---|
| KR | 10-2004-0086852 A | 10/2004 |
| KR | 10-0849153 B1 | 7/2008 |

\* cited by examiner

*Primary Examiner* — Huy Q Phan
*Assistant Examiner* — Adam S Clarke
(74) *Attorney, Agent, or Firm* — Studebaker & Brackett PC (57) ABSTRACT

Disclosed herein are a probe for a nondestructive testing device using a crossed gradient induced current and a method of manufacturing an induction coil for a nondestructive testing device. The probe for a nondestructive testing device using a crossed gradient induced current includes an induction coil formed to have a predetermined width and to generate first and second induced currents in a direction crossing each other when a current is applied from a power supply, and a magnetic sensor part installed adjacent to the induction coil so as to measure the first and second induced currents induced from the induction coil.

11 Claims, 8 Drawing Sheets

PROBE FOR NONDESTRUCTIVE TESTING DEVICE USING CROSSED GRADIENT INDUCED CURRENT AND METHOD FOR MANUFACTURING INDUCTION COIL FOR NONDESTRUCTIVE TESTING DEVICE

CROSS-REFERENCE TO RELATED APPLICATION

This application claims priority to and the benefit of Korean Patent Application No. 10-2018-0149026, filed on Nov. 27, 2018, the disclosure of which is incorporated herein by reference in its entirety.

BACKGROUND

1. Field of the Invention

The present invention relates to a probe for a nondestructive testing device using a crossed gradient induced current and a method of manufacturing an induction coil for a nondestructive testing device, and more particularly, to a probe for a nondestructive testing device which is capable of performing nondestructive testing by generating first and second induced currents crossing each other when a current is applied, and a method of manufacturing an induction coil.

2. Discussion of Related Art

Eddy current nondestructive testing is a method of detecting a defect which is inherent in a target object using an electromagnetic phenomenon. When an alternating current (AC) current is applied to a coil adjacent to the target object, an induced current occurs in the target object. When a defect is present in a path of the induced current, a flow of the induced current is distorted, and thus a distribution of a time-varying magnetic flux density is varied around the defect. When the variation is measured with coils, Hall sensors, giant magnetoresistive (GMR) sensors, or the like, the presence, location, and size of the defect may be tested. The eddy current nondestructive testing is used across industrial categories to check integrity of a device structure of a metal material. Meanwhile, when the coils, the Hall sensors, the GMR sensors, or the like are arranged in a linear shape, an area shape, an annular shape, or a cylindrical shape, the defect may be detected and recognized at a faster speed.

For example, a heat exchanger transfers heat of a fluid through a heat transfer surface of a heat transfer tube to perform functions such as heating, cooling, condensation, and the like. The heat transfer tube of the heat exchanger, which has been used for a long period of time in high temperature, high pressure, vibration, and water chemistry environments, may be damaged due to corrosion, pitting, erosion, pitting corrosion, abrasion, wall-thinning, fatigue cracking, stress corrosion cracking (SCC), irradiation assisted stress corrosion cracking (IASCC), and the like. When the heat exchanger fails to perform an original function due to such damage, it may interfere with normal operation of the power plant. Therefore, nondestructive testing for checking integrity of the heat transfer tube of the heat exchanger is periodically performed during a planned preventive maintenance period of the power plant.

Bobbin-type eddy current nondestructive testing for checking integrity of the heat transfer tube of the heat exchanger is periodically performed during the planned preventive maintenance period of the power plant. When an AC current is applied to an inserted bobbin type probe, an induced current occurs in the heat transfer tube. When a defect is present in a path of the induced current, impedance of the probe increases. Further, when the defect is present in an inner wall and an outer wall of the heat transfer tube, a phase difference occurs. Therefore, when the impedance and the phase difference of the bobbin-type probe are measured, a position and a depth of the defect may be tested. According to the test result on the basis of such a principle, tube plugging maintenance is performed on the heat transfer tube of which a volumetric defect exceeds a tube thickness maintenance standard. Meanwhile, as the subsequent measures with respect to the test result of the heat transfer tube, when a cracking defect is found in the heat transfer tube, a measure of tube plugging should be taken regardless of the tube thickness maintenance standard. This is because the cracking defect develops very rapidly as compared with a volumetric defect. Thus, when the cracking defect is incorrectly evaluated as a volumetric defect and remains to be unrepaired, there is a risk of leakage due to a rupture of the heat transfer tube during a normal operation of the power plant. Therefore, in the nondestructive testing of the heat transfer tube of the heat exchanger using the bobbin-type probe, an operation is added of determining a type of the defect using a separate tool at a point by which a defect signal is detected.

In order to supplement such a limitation, a rotary probe is additionally applied to a site with respect to the defect detected as the test result by the bobbin-type probe. The rotary probe is used to helically scan an inner surface of the heat transfer tube by a motor installed behind a head of the rotary probe and determine whether an abnormality indication of the bobbin-type probe is a cracking defect or a volumetric defect. However, since a testing speed is low and the rotary probe is necessary to rotate along an inner wall of a test piece, a service life of the rotary probe is short so that the rotary probe is not used for a total inspection.

Meanwhile, an annular array probe has been developed which can be used to determine the presence of a defect and quantitative evaluation at a higher speed by annularly arranging active coil sensors along an inner wall of a heat transfer tube having a small diameter to axially scan the heat transfer tube. As compared to the rotary probe, the annular array probe has an advantage of being capable of detecting the defect at a high speed. However, in the case of the active coil sensors, when all the active coil sensors arranged in an annular shape are simultaneously driven, mutual interference occurs. In order to solve such a problem, a distance between the active coil sensors should be increased or the active coil sensors should be alternately driven while the distance between the active coil sensors is maintained enough to avoid the mutual interference. In order to perform such an alternate drive, a lot of heat and noise are generated in a complicated signal processing circuit, i.e., during multiplexing, such that a service life of the device is shortened. Further, since the active coil sensor should undergo a process of being separately manufactured by a winding machine, it is difficult to achieve mass production, miniaturize a size of the active coil sensor, and obtain uniform quality. Therefore, since a manufacturing cost is high and due to the size of the active coil sensor, there is a limit that spatial resolution cannot be increased.

In order to overcome such a limitation of the spatial resolution or the complexity of the signal processing circuit as well as in order to carry out nondestructive testing of heat transfer tube of a heat exchanger having a small diameter, an annular and cylindrical magnetic sensor array has been developed to visualize an eddy current and detect and evaluate a defect using a semiconductor-based passive magnetic sensor in which excitation coils are arranged in an annular or cylindrical shape. When an AC current is applied to a bobbin-type coil, an induced current is generated in an arc direction of the heat transfer tube. When a defect is present, the induced current is distorted and thus a time-varying magnetic field inside the heat transfer tube is distorted. The time-varying magnetic field may be measured by a GMR sensor, a Hall sensor, a coil sensor, and a passive magnetic sensor arranged in an annular or cylindrical shape to quantitatively evaluate a shape and a size of the defect as well as the presence of the defect. In particular, since intensity of the time-varying magnetic field due to the presence of the defect is measured by the passive magnetic sensor, unlike the active coil sensor, the annular and cylindrical magnetic sensor array is small in size and has an advantage of being capable of increasing spatial resolution due to an absence of interference between the sensors and there is no need to alternately drive the sensors.

However, there is a disadvantage that defect detection performance is different according to a direction of a cracking defect. That is, when the cracking defect is present in an axial direction, distortion of the induced current is generated having a large intensity in a narrow region at both ends of the defect, and, when the cracking defect is present in an arc direction, the distortion of the induced current is generated having a low intensity in a wide area at both sides of the defect. Therefore, there is a limit in that defect detection capability with respect to an axial crack is different from defect detection capability with respect to an arc crack.

The phenomenon in which the defect detection performance is different according to the direction of the cracking defect does not occur only in the nondestructive testing of a small-diameter tube such as the heat transfer tube of the heat exchanger. That is, even when a shape of a test piece is a flat surface shape or a curved surface shape, there is a limit in that it is difficult to test a cracking defect in the same direction as a direction of application of the induced current.

RELATED ART DOCUMENT

Patent Document (Patent Document 1) Korean Patent Registration No. 10-0849153, entitled "Measurement Probe and Authentication Device Comprising Same"

SUMMARY OF THE INVENTION

The present invention is directed to a probe for a nondestructive testing device using a crossed gradient induced current that is capable of detecting a defect at a high speed and quantitatively evaluating the detected defect by generating first and second induced currents crossing each other using an induction coil which is formed to be folded in multiple stages and measuring an amplitude and a phase difference distribution of an electromagnetic field due to distortion of an induced current generated around the defect using arrayed magnetic sensors, and a method of manufacturing an induction coil for a nondestructive testing device.

According to an aspect of the present invention, there is provided a probe for a nondestructive testing device using a crossed gradient induced current that includes an induction coil formed to have a predetermined width and to generate a first induced current and a second induced current in a direction crossing each other when a current is applied from a power supply, and a magnetic sensor part installed adjacent to the induction coil so as to measure the first and second induced currents induced from the induction coil.

The induction coil may be formed such that the first and second induced currents are generated in a direction crossing with respect to an imaginary reference line extending in a width direction.

The induction coil may be formed to linearly extend to a predetermined length.

The induction coil may be formed to extend in an annular shape having a predetermined radius.

The induction coil may be formed in an annular shape such that a hollow may be provided at a center of the induction coil and manufactured by hinging a base coil, which generates an induced current in a circumferential direction when a current is applied, in multiple stages.

The induction coil may be manufactured such that first folded portions of the base coil, which mutually face each other based on a center of the hollow, may be folded to be located parallel to second folded portions of the base coil between the first folded portions, and then the second folded portions may be hinged in multiple stages in a direction crossing a length direction of the second folded portion such that the second folded portions may be twisted with each other.

The induction coil may be manufactured to include the base coil in which a ratio of a circumferential length to a width of the base coil may be an integer multiple of $2\sqrt{2}$.

According to another aspect of the present invention, there is provided a method of manufacturing an induction coil for a nondestructive testing device, which includes providing a base coil which generates an induced current when a current is applied from a power supply, and manufacturing an induction coil by hinging the base coil in multiple stages such that a first induced current and a second induced current crossing each other are generated when a current is applied.

In the providing operation, the base coil may be formed in an annular shape such that a hollow may be provided in a center of the base coil to generate an induced current in a circumferential direction when the current is applied.

The manufacturing operation may include a first hinging operation of hinging first folded portions of the base coil facing each other based on a center of the hollow, and after the first hinging operation, a second hinging operation of hinging second folded portions of the base coil between the first folded portions in multiple stages.

In the first hinging operation, the first folded portions of the base coil may be hinged to be located parallel to the second folded portions.

In the second hinging operation, the second folded portions may be hinged in multiple stages in a direction crossing a length direction of the second folded portion such that the second folded portions are twisted with each other.

A ratio of a circumferential length to a width of the base coil may be an integer multiple of $2\sqrt{2}$.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, a probe for nondestructive testing device using crossed gradient induced current and a method of manufacturing an induction coil 20 for a nondestructive testing device according to an embodiment of the present invention will be described in detail with reference to the accompanying drawings. The present invention may be modified in various forms and may have a variety of embodiments, and, therefore, specific embodiments will be illustrated in the drawings and a description thereof will be described in detail in the following description. The embodiments to be disclosed below, therefore, are not to be taken in a sense which limits the present invention to specific embodiments and should be construed to include modification, equivalents, or substitutes within the spirit and technical scope of the present invention. In describing each drawing, a similar reference numeral is given to a similar component. In the accompanying drawings, dimensions of structures are shown in an enlarged scale for clarity of the present invention.

Although the terms "first," "second," and the like may be used herein to describe various components, these components should not be limited to these terms. The terms are used only for the purpose of distinguishing one component from another component. For example, without departing from the scope of the present invention, a first component may be referred to as a second component, and similarly, a second component may also be referred to as a first component.

Terms used herein are used only for the purpose of describing specific embodiments and are not intended to limit the present invention. Unless the context clearly dictates otherwise, the singular form includes the plural form. It should be understood that the terms "comprise," "include," and "have" specify the presence of features, numbers, steps, operations, components, elements, or combinations thereof stated herein, but do not preclude the presence or possibility of adding one or more other features, numbers, steps, operations, components, elements, or combinations thereof.

Unless otherwise defined, all terms including technical or scientific terms used herein have the same meaning as commonly understood by those skilled in the art to which the present invention pertains. General terms that are defined in a dictionary shall be construed as having meanings that are consistent in the context of the relevant art and are not to be interpreted as having an idealistic or excessively formalistic meaning unless clearly defined in the present application.

Figure 1:
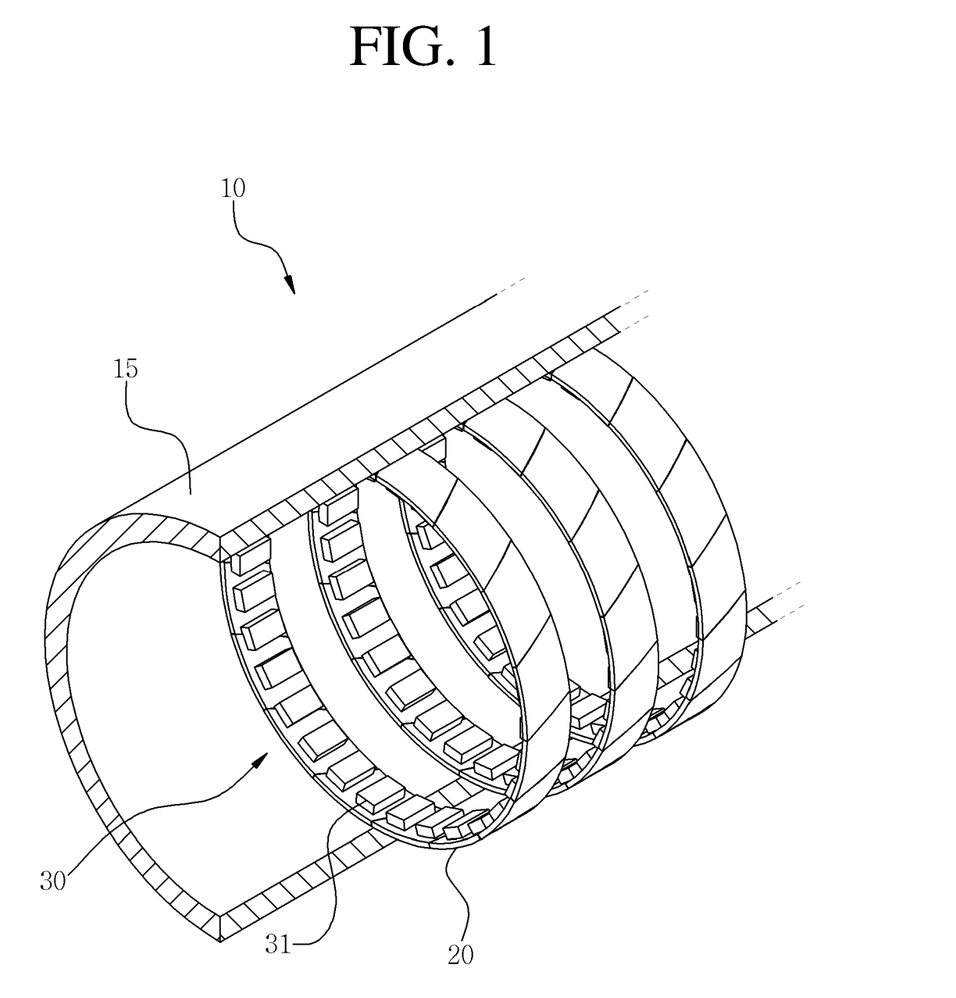
FIG. 1 is a perspective view illustrating a probe using a crossed gradient induced current according to the present invention.

FIG. 1 illustrates a probe 10 for a nondestructive testing device using a crossed gradient induced current according to the present invention.

Referring to the drawing, the probe 10 for a nondestructive testing device using a crossed gradient induced current is inserted into a test piece 15, such as a tube for a heat exchanger, and installed in a nondestructive testing device for testing whether the test piece 15 has a defect. The probe 10 includes a plurality of induction coils 20 and a magnetic sensor part 30.

Each of the induction coils 20 is formed to have a predetermined width in an annular shape and formed to induce an induced current when an alternating current (AC) current is applied from a power supply (not shown). In this case, the induction coil 20 is formed such that first and second induced currents are generated in a direction in which the first and second induced currents cross each other when the AC current is applied. It is preferable that the first and second induced currents are formed to intersect with respect to an imaginary reference line extending in a width direction. That is, the first and second induced currents are induced to be inclined at 45° and 135° with respect to the imaginary reference line extending in the width direction of the induction coil 20.

Here, the induction coil 20 is formed in an annular shape so that a hollow is provided in a central portion thereof, and the induction coil 20 is manufactured such that a base coil generating an induced current in a circumferential direction when a current is applied is hinged in multiple stages. That is, the induction coil 20 is manufactured such that first folded portions 51 of the base coil, which mutually face each other based on a center of the hollow, are folded to be located parallel to second folded portions 52 of the base coil between the first folded portions 51, and then the second folded portions 52 are hinged in multiple stages in a direction crossing a length direction of the second folded portion 52 such that the second folded portions 52 are twisted with each other. In this case, it is preferable that a ratio of a circumferential length to a width of the base coil is an integer multiple of $2\sqrt{2}$.

The manufacturing method of the induction coil 20 will be described in detail in a manufacturing method of the induction coil 20 for a nondestructive testing device that will be described below.

Figure 2:
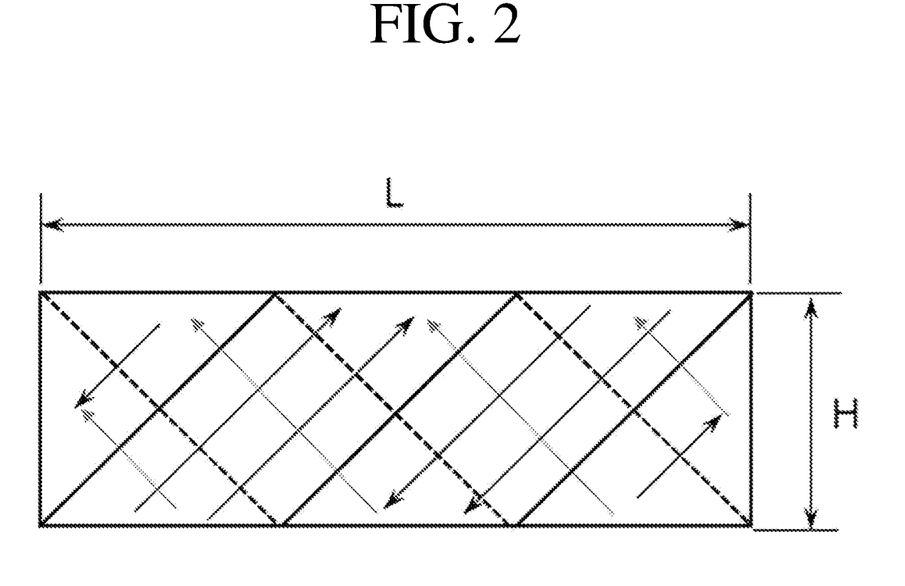
FIG. 2 is a plan view illustrating an induction coil of a probe using a crossed gradient induced current according to another embodiment of the present invention.
Figure 3:
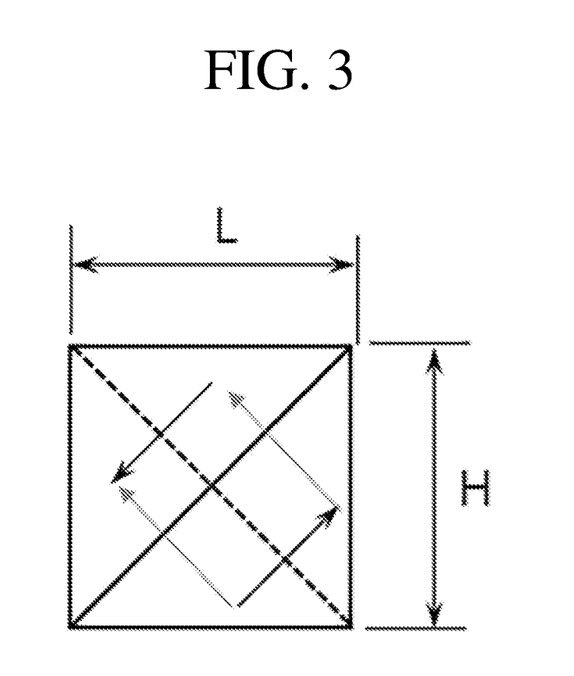
FIG. 3 is a plan view illustrating an induction coil of a probe using a crossed gradient induced current according to still another embodiment of the present invention.

A plurality of induction coils 20 constituted as described above are arranged to be spaced apart from each other in an axial direction of the test piece 15. Meanwhile, in the illustrated example, a structure in which the induction coils 20 are formed in an annular shape is illustrated, but the induction coils 20 are not limited thereto. As shown in FIG. 2, the induction coils 20 may be formed to linearly extend to a predetermined length, or, as shown in FIG. 3, the induction coils 20 may be formed in a quadrangular shape.

The magnetic sensor part 30 is installed adjacent to the induction coils 20 so as to measure the first and second induced currents which are induced from the induction coils 20. The magnetic sensor part 30 includes a plurality of magnetic sensors 31. The plurality of magnetic sensors 31 may be arranged on an inner surface of each of the induction coils 20 to be spaced apart from each other along in the circumferential direction. Here, a Hall sensor or a giant magnetoresistive (GMR) sensor may be applied as the magnetic sensor 31.

Meanwhile, the probe 10 for a nondestructive testing device using a crossed gradient induced current according to the present invention includes a support member (not shown) for supporting the induction coils 20 and the magnetic sensor parts 30. Although not shown in the drawings, the support member may installed to pass through a center of the annular induction coils 20 to support the induction coils 20 and the magnetic sensor parts 30 or be formed in a cylindrical shape to surround outer surfaces of the induction coils 20 to support the induction coils 20 to which the magnetic sensor parts 30 are bonded. Meanwhile, the support member is not limited thereto. Any support tool may be employed as the support member as long as it does not interfere with induced currents induced from the induction coils 20 and can support the induction coils 20 and the magnetic sensor parts 30.

When power is applied to the induction coils 20 from the power supply, first and second induced currents are induced from the induction coil 20. Here, the first and second induced currents are induced in a direction in which the first and second induced currents cross each other, i.e., are respectively induced to be inclined at angles of 45° and 135° with respect to the width direction of the induction coil 20. The probe 10 for a nondestructive testing device using a crossed gradient induced current according to the present invention, which is constituted as described above, has an advantage that, even when a cracking defect of the test piece 15 is formed in an axial or circumferential direction of the test piece 15, distortion of an induced current, which is induced in a gradient manner, due to the first and second induced currents is generated in a relatively large intensity such that defect detection performance with respect to the test piece 15 is improved.

Figure 4:
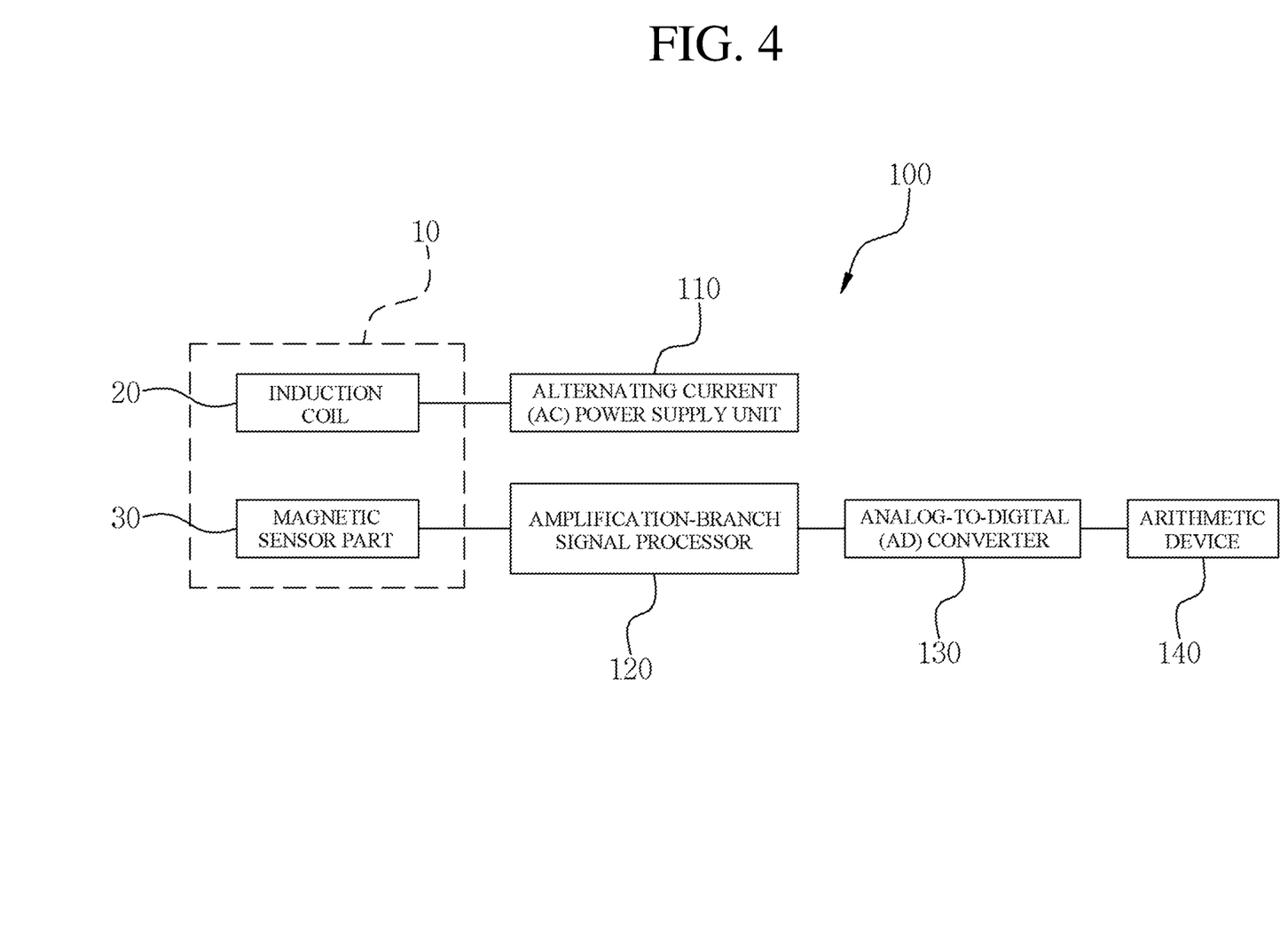
FIG. 4 is a block diagram illustrating a nondestructive testing device to which the probe using a crossed gradient induced current of the present invention is applied.

Meanwhile, FIG. 4 illustrates a nondestructive testing device 100 to which the probe 10 for a nondestructive testing device using a crossed gradient induced current according to the present invention is applied.

Referring to the drawing, the nondestructive testing device 100 includes the probe 10 for a nondestructive testing device using a crossed gradient induced current according to the present invention, an AC power supply unit 110 serving as the power supply and connected to the induction coil 20 so as to selectively apply AC power of various frequencies to the induction coil 20 of the probe 10, an amplification-branch signal processor 120 connected to the magnetic sensor part 30 of the probe 10 and configured to amplify respective signals output from the magnetic sensors 31 and output an amplitude and a phase difference signal from the respective signals, an analog-to-digital (AD) converter 130 for converting an analog signal output from the amplification-branch signal processor 120 into a digital signal, and an arithmetic device 140 for calculating a signal corresponding to twice the number of the magnetic sensors 31, which is output from the magnetic sensor part 30 and the amplification-branch signal processor 120, that is, the amplitude and a distribution of the phase difference, to determine whether a defect of a test target is present, a position of the defect, and a size thereof.

The probe 10 is inserted into the test piece 15 such as a tube of a heat exchanger, and AC power is applied from the AC power supply unit 110 to the induction coil 20, and then a signal measured in the magnetic sensor part 30 is analyzed in the arithmetic device 140 to calculate information with respect to a defect of the test piece 15.

When testing is performed using the nondestructive testing device to which the probe 10 using a crossed gradient induced current according to the present invention is applied, as compared to the conventional eddy current testing method, the testing is performed by inducing a crossed gradient induced current so that there is an advantage of quantitatively measuring a distortion distribution of an electromagnetic field due to the presence of the defect to determine corrosion, abrasion, and cracking and quantitatively evaluating the corrosion, abrasion, and cracking.

Further, as compared to the conventional arrayed magnetic sensor probe, the present invention may improve the defect detection ability irrespective of the direction of the cracking defect, and there is an effect of making the probe in a small size by minimizing a size of an induced current applying device.

Figure 5:
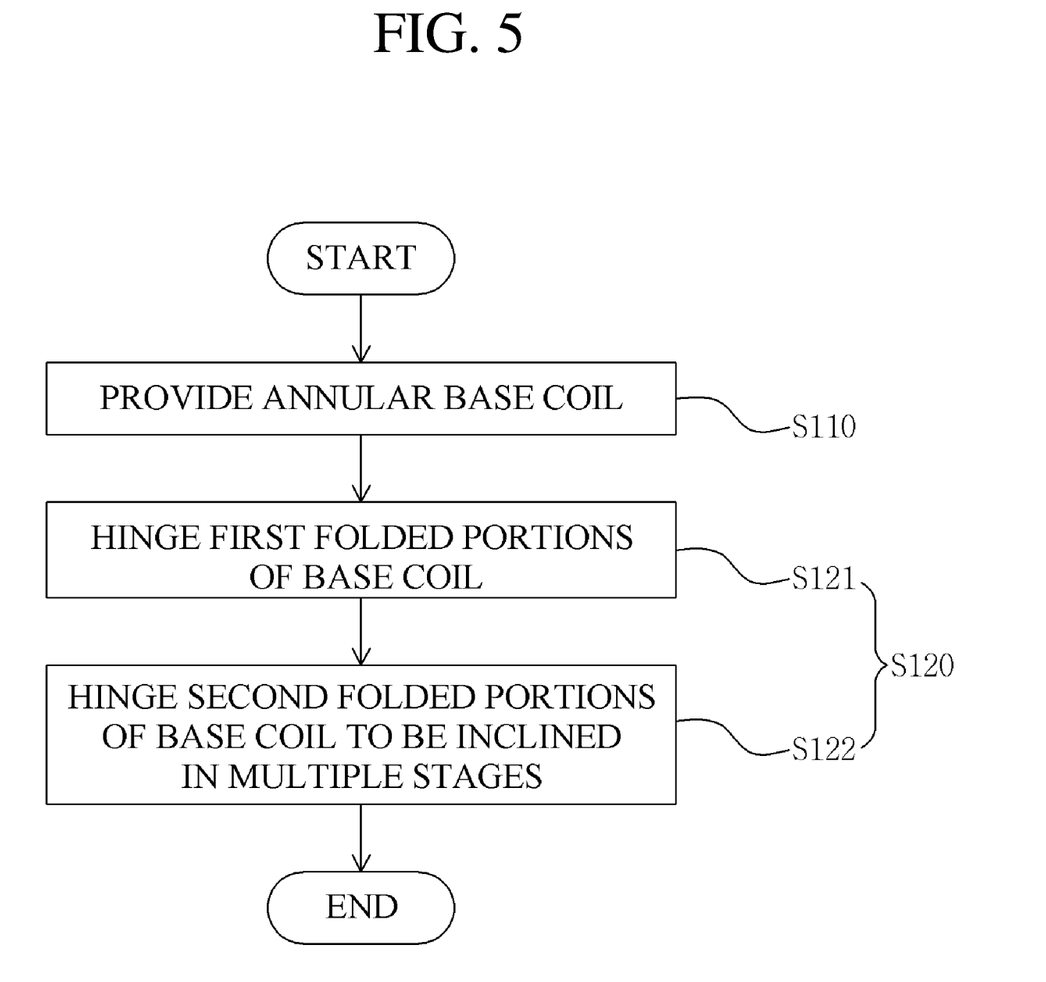
FIG. 5 is a flowchart illustrating a method of manufacturing an induction coil for a nondestructive testing device according to the present invention.

Meanwhile, FIG. 5 illustrates a flowchart of a method of manufacturing the induction coil 20 for a nondestructive testing device.

Referring to the drawing, the method of manufacturing the induction coil 20 for a nondestructive testing device includes a providing operation S110 and a manufacturing operation S120.

Figure 6:
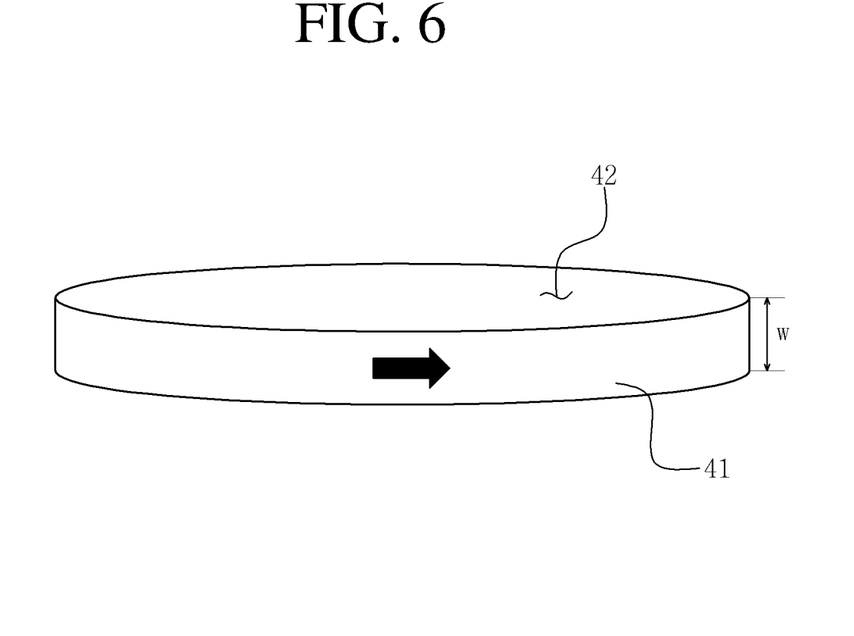
FIGS. 6 to 10 are diagrams illustrating a process of manufacturing an induction coil according to the method of manufacturing an induction coil for a nondestructive testing device of FIG. 5.

The providing operation S110 is an operation of providing a base coil 41 which generates an induced current when a current is applied from the power supply. As shown in FIG. 6, the base coil 41 has a predetermined width W and is formed in an annular shape such that a hollow 42 is provided at a central portion thereof to generate an induced current in the circumferential direction when a current is applied.

The manufacturing operation S120 is an operation in which the base coil 41 is hinged in multiple stages to manufacture the induction coil 20 such that first and second induced currents cross each other when the current is applied. The manufacturing operation S120 includes a first hinging operation S121 and a second hinging operation S122.

Figure 7:
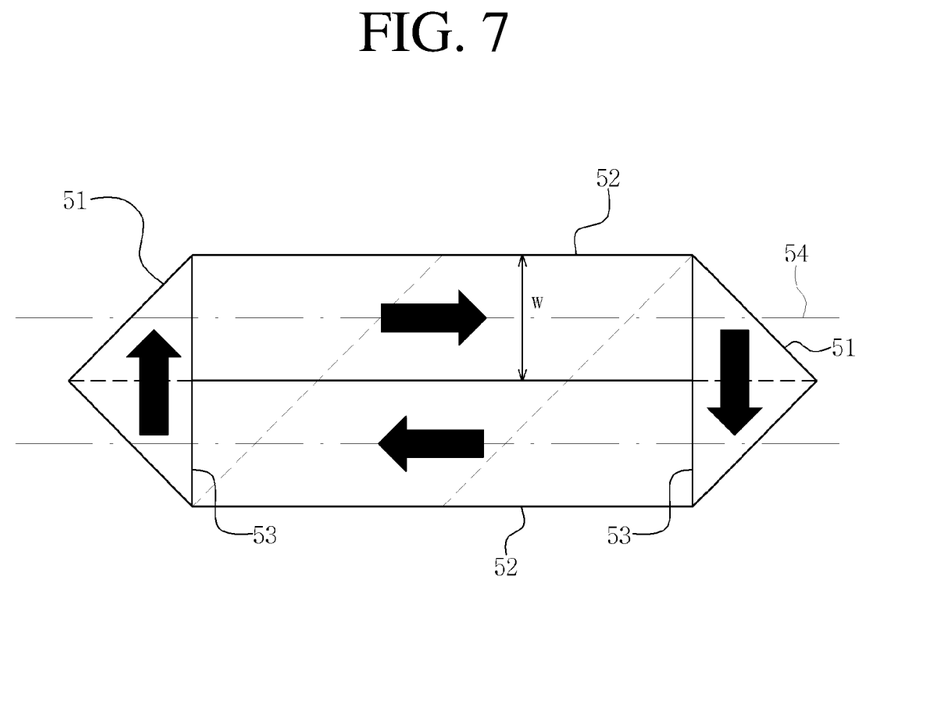

The first hinging operation S121 is an operation of hinging the first folded portions 51 of the base coil 41 facing each other based on a center of the hollow 42. As shown in FIG. 7, the first folded portions 51 of the base coil 41 are hinged to be located parallel to the second folded portions 52 of the base coil 41 between the first folded portions 51. In this case, each of the first folded portions 51 is folded to allow the base coil 41 to be a triangular shape. It is preferable to fold the first folded portions 51 such that facing inner sides 53 of the first folded portions 51 become triangular shapes orthogonal to center lines 54 in a length direction of the second folded portions 52.

Figure 8:
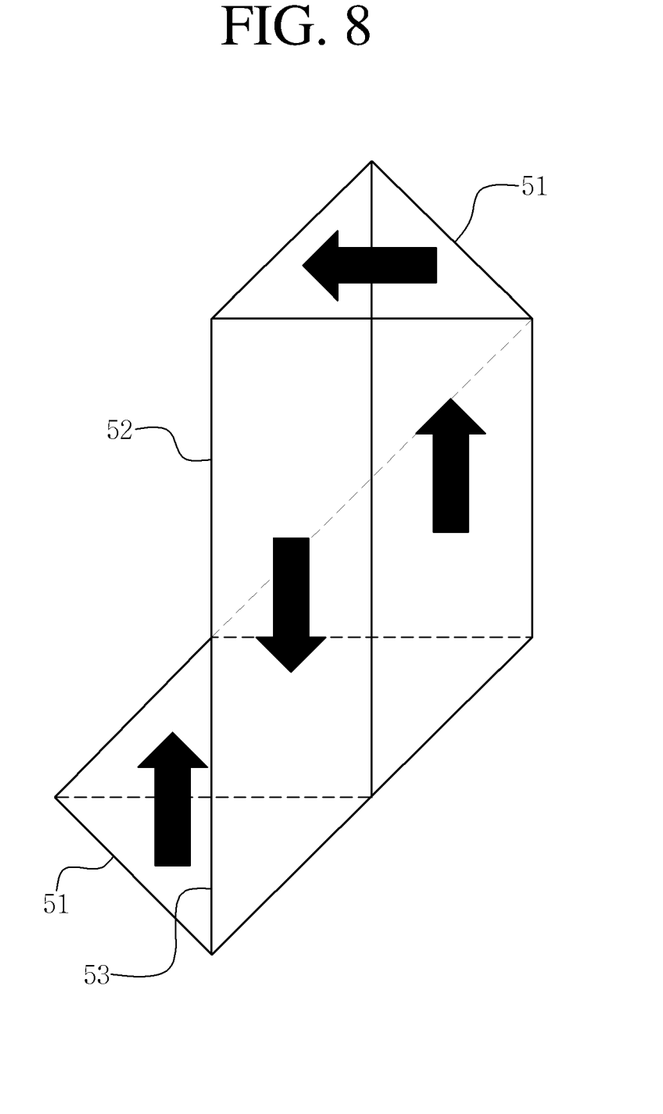
Figure 9:
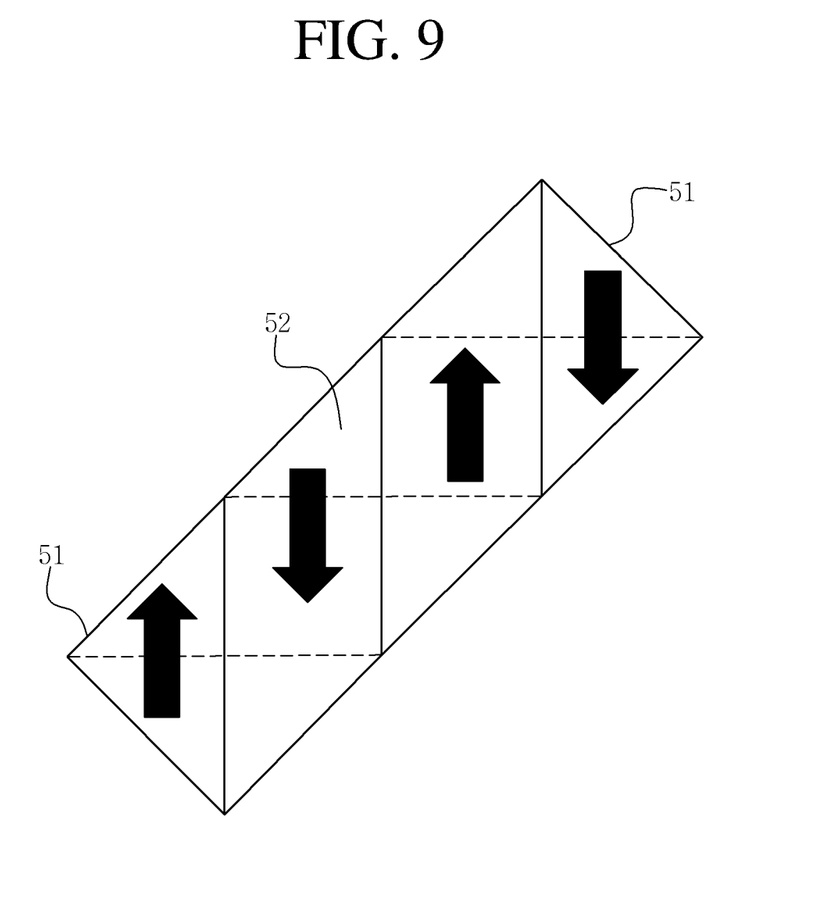

After the first hinging operation S121, the second hinging operation S122 is an operation of hinging the second folded portions 52 of the base coil 41 between the first folded portions 51 in multiple stages. As shown in FIGS. 8 and 9, it is preferable that the second folded portions 52 are folded in multiple stages in a direction crossing the length direction of the second folded portion 52 such that the second folded portions 52 are twisted with each other. In the drawings, an arrow indicates a direction of the induced current of the base coil 41.

Figure 10:
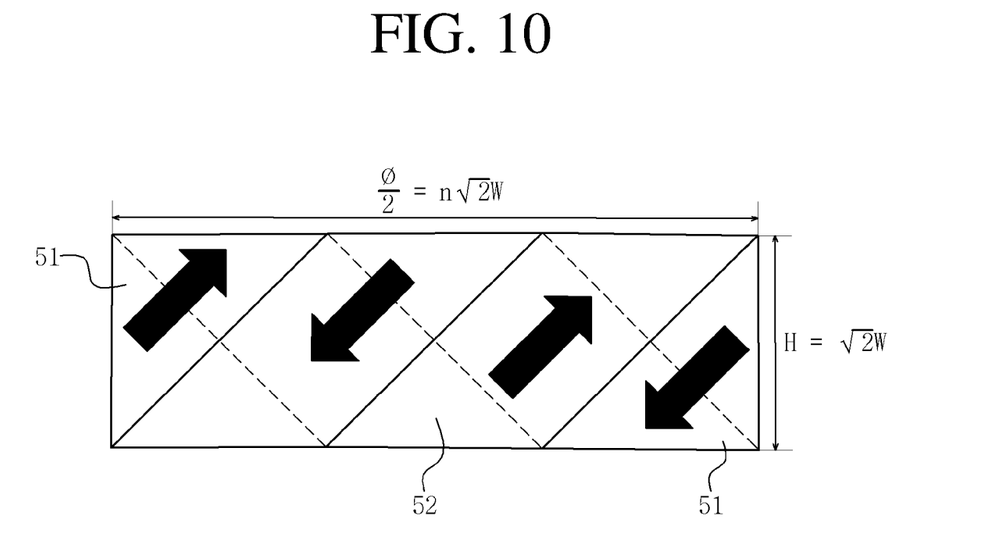

Here, referring to FIG. 8, the second folded portions 52 are folded upward at an angle of 45° with respect to the center line 54 in the length direction of the second folded portion 52 such that edges of the second folded portions 52 are brought into contact with the inner sides 53 of the leftmost first folded portions 51. Next, referring to FIG. 9, the remaining portions of the second folded portions 52 are folded downward to be inclined such that the edges of the second folded portions 52 are brought into contact with the inner sides 53 of the rightmost first folded portions 51. As described above, the second folded portions 52 of the base coil 41 are folded to be inclined in multiple stages to manufacture the induction coil 20 as shown in FIG. 10. Here, in the induction coil 20 in which the base coil 41 is folded in multiple stages, the induced currents indicated by the arrows in the drawings are induced to be respectively inclined at angles of 45° and 135° with respect to the center line 54 in the length direction and to cross each other.

Here, a width H of the induction coil 20 is $\sqrt{2}$ times a width W of the base coil 41, and a length of the induction coil 20 is half of a circumferential length φ of the base coil 41. In the drawing, n is an integer multiple, and, in the illustrated example, three is applied. Accordingly, when the ratio of the circumferential length to the width is an integer multiple of $2\sqrt{2}$, the induction coil 20 in which the first and second induced currents are respectively inclined at the angles of 45° and 135° and induced to cross each other may be manufactured.

An operator may manufacture the induction coil 20 by providing the base coil 41 having a suitable width and a suitable circumferential length according to the width or length of the induction coil 20. The induction coil 20 manufactured by the base coil 41 may be manufactured in an annular shape by interconnecting the first folded portions 51.

When testing is performed using a nondestructive testing device to which a probe using a crossed gradient induced current according to the present invention is applied, as compared to the conventional eddy current testing method, the testing is performed by inducing a crossed gradient induced current so that there is advantage of quantitatively measuring a distortion distribution of an electromagnetic field due to the presence of the defect to determine corrosion, abrasion, and cracking and quantitatively evaluating the corrosion, abrasion, and cracking.

Further, as compared to the conventional arrayed magnetic sensor probe, the present invention may improve the defect detection ability irrespective of the direction of the cracking defect, and there is an effect of being capable of making the probe in a small size by minimizing a size of an induced current applying device. The description of the embodiments disclosed herein is provided to enable those skilled in the art to use or practice the present invention. Various modifications with respect to these embodiments will be apparent to those skilled in the art, and the general principles defined herein may be applied to other embodiments without departing from the scope of the present invention. Therefore, the present invention should not be limited to the embodiments set forth herein but should be construed in the broadest scope consistent with the principles and novel features set forth herein.

What is claimed is:

1. A probe for a nondestructive testing device using a crossed gradient induced current, the probe comprising:
   an induction coil formed to have a predetermined width and to generate a first induced current and a second induced current in a direction crossing each other when a current is applied from a power supply; and
   a magnetic sensor part installed adjacent to the induction coil so as to measure the first and second induced currents induced from the induction coil,
   wherein the induction coil is formed in an annular shape such that a hollow is provided at a center of the induction coil and manufactured by hinging a base coil, which generates an induced current in a circumferential direction when a current is applied, in multiple stages, and
   wherein the induction coil is manufactured such that first folded portions of the base coil, which mutually face each other based on a center of the hollow, are folded to be located parallel to second folded portions of the base coil between the first folded portions, and then the second folded portions are hinged in multiple stages in a direction crossing a length direction of the second folded portion such that the second folded portions are twisted with each other.

2. The probe of claim 1, wherein the induction coil is formed such that the first and second induced currents are generated in a direction crossing with respect to an imaginary reference line extending in a width direction.

3. The probe of claim 2, wherein the induction coil is formed to linearly extend to a predetermined length.

4. The probe of claim 2, wherein the induction coil is formed to extend in an annular shape having a predetermined radius.

5. The probe of claim 1, wherein the induction coil is formed to linearly extend to a predetermined length.

6. The probe of claim 1, wherein the induction coil is formed to extend in an annular shape having a predetermined radius.

7. The probe of claim 1, wherein the induction coil is manufactured of the base coil of which a ratio of a circumferential length to a width is an integer multiple of $2\sqrt{2}$.

8. A method of manufacturing an induction coil for a nondestructive testing device, the method comprising:
   providing a base coil which generates an induced current when a current is applied from a power supply; and
   manufacturing an induction coil by hinging the base coil in multiple stages such that a first induced current and a second induced current crossing each other are generated when a current is applied,
   wherein in the providing operation, the base coil is formed in an annular shape such that a hollow is provided in a center of the base coil to generate an induced current in a circumferential direction when the current is applied, and
   wherein the manufacturing operation includes:
   a first hinging operation of hinging first folded portions of the base coil facing each other based on a center of the hollow; and
   after the first hinging operation, a second hinging operation of hinging second folded portions of the base coil between the first folded portions in multiple stages.

9. The method of claim 8, wherein in the first hinging operation, the first folded portions of the base coil are hinged to be located parallel to the second folded portions.

10. The method of claim 9, wherein in the second hinging operation, the second folded portions are hinged in multiple stages in a direction crossing a length direction of the second folded portion such that the second folded portions are twisted with each other.

11. The method of claim 8, wherein a ratio of a circumferential length to a width of the base coil is an integer multiple of $2\sqrt{2}$.

* * * * *